(12) United States Patent
Nordin et al.

(10) Patent No.: US 7,234,944 B2
(45) Date of Patent: Jun. 26, 2007

(54) PATCH FIELD DOCUMENTATION AND REVISION SYSTEMS

(75) Inventors: Ronald A. Nordin, Naperville, IL (US); Jack E. Caveney, Hinsdale, IL (US)

(73) Assignee: Panduit Corp., Tinley Park, IL (US)

(*) Notice: Subject to any disclaimer, the term of this patent is extended or adjusted under 35 U.S.C. 154(b) by 0 days.

(21) Appl. No.: 11/467,330

(22) Filed: Aug. 25, 2006

(65) Prior Publication Data

US 2007/0049127 A1 Mar. 1, 2007

Related U.S. Application Data

(60) Provisional application No. 60/711,960, filed on Aug. 26, 2005.

(51) Int. Cl.
*H01R 29/00* (2006.01)
*H02B 1/056* (2006.01)

(52) U.S. Cl. .......................... 439/49; 439/955

(58) Field of Classification Search ............... 439/49, 439/955, 489, 490, 700
See application file for complete search history.

(56) References Cited

U.S. PATENT DOCUMENTS

| | | | |
|---|---|---|---|
| 4,863,393 A | 9/1989 | Ward et al. | 439/188 |
| 5,074,801 A | 12/1991 | Siemon | 439/188 |
| 5,575,665 A | 11/1996 | Shramawick et al. | 439/49 |
| 5,618,185 A | 4/1997 | Aekins | 439/76.1 |
| 5,803,770 A | 9/1998 | Swendson et al. | 439/676 |
| 5,888,085 A | 3/1999 | Meyerhoefer et al. | 439/188 |
| 6,172,508 B1 | 1/2001 | Nutt | 324/504 |
| 6,203,334 B1 | 3/2001 | Daoud et al. | 439/76.1 |
| 6,347,715 B1 | 2/2002 | Drozdenko et al. | 211/26 |
| 6,535,367 B1 | 3/2003 | Carpenter et al. | 361/42 |
| 2002/0076950 A1 | 6/2002 | Frostrom et al. | 439/49 |
| 2003/0073343 A1 | 4/2003 | Belesimo | 439/490 |
| 2003/0096536 A1 | 5/2003 | Clark et al. | 439/676 |
| 2005/0136729 A1* | 6/2005 | Redfield et al. | 439/409 |
| 2005/0195584 A1* | 9/2005 | AbuGhazaleh et al. | 361/780 |
| 2005/0239339 A1* | 10/2005 | Pepe | 439/676 |

* cited by examiner

*Primary Examiner*—Tulsidas C. Patel
*Assistant Examiner*—Vladimir Imas
(74) *Attorney, Agent, or Firm*—Robert A. McCann; Zachary J. Smolinski; Anthony P. Curtis

(57) ABSTRACT

A communication network device and corresponding patch field system are disclosed. The device includes a port module, ports, and an appliqué attached to a face of the port module. The appliqué includes a printed circuit board (PCB) with conductive pads. A patch cord connects the device with an intelligent patch panel. The patch cord contains at least one system wire. The patch panel is adapted to measure a resistance associated with each port via the system wire. An open circuit indicates that no patch cord is attached to the port, a resistance within a first range indicates that the patch cord is attached only to the port of the intelligent patch panel, and a resistance within a second range less than the first range indicates that the patch cord connects the intelligent patch panel and the device.

20 Claims, 7 Drawing Sheets

PATCH FIELD DOCUMENTATION AND REVISION SYSTEMS

RELATED APPLICATIONS

The present application claims the benefit of priority to U.S. Provisional Patent Application Ser. No. 60/711,960, filed Aug. 26, 2005, entitled "PATCH FIELD DOCUMENTATION AND REVISION SYSTEMS," which is hereby incorporated by reference in its entirety. The present application also incorporates by reference in their entireties U.S. patent application Ser. No. 11/265,316, filed Nov. 2, 2005, which claims the benefit of priority to U.S. Provisional Patent Application Ser. No. 60/624,753, filed Nov. 3, 2004, both of which are entitled "Method and Apparatus for Patch Panel Patch Cord Documentation and Revision."

TECHNICAL FIELD

The present invention relates to documentation systems and more particularly relates to a system for documenting and revising patch cord connections in a communications network patch field.

BACKGROUND

Patch panels are used in communications networks as intermediate elements between horizontal cabling (to which endpoint devices such as computers and telephones are connected) and network switches. When physical connections between endpoint devices and network switches are moved, added, or changed, patch panels are the points at which technicians complete the required moves, additions, or changes of cabling within patch fields. It is important to keep track of changes that are made to patch cord connections within the patch field. Proper documentation of changes in the patch field assures that the routing of patch cords is always known and further assures that any future changes are completed correctly.

In interconnect network configurations, one patch panel is placed between the horizontal cabling and the network switch. In an interconnect configuration, the documentation of patch cord connections between the patch panel and the switch will provide the necessary documentation of connections between the switch and the horizontal cabling. In cross-connect network configurations, two patch panels are placed between the horizontal cabling and the network switch. In a cross-connect configuration, the documentation of patch cord connections between the two patch panels will provide the necessary documentation of connections between the switch and the horizontal cabling. It is desirable to have a patch cord management system that will support both interconnect and cross-connect configurations. It is also desirable for a patch cord management system to have a minimal impact on existing networks.

SUMMARY OF THE INVENTION

According to one embodiment of the present invention, a patch cord management system supports patch cord management in communications networks having an interconnect configuration. In one embodiment, appliqués are applied to network switches—such as Ethernet switches—to provide for the management of patch cord connections between an intelligent patch panel and the network switch. In one embodiment, indicator lights are provided to guide the installation and management of patch cord connections. Each network switch port that is connected to an intelligent patch panel is uniquely identifiable by the intelligent patch panel.

According to another embodiment of the present invention, a patch cord management system supports patch cord management in communications networks having a cross-connect configuration.

DETAILED DESCRIPTION OF PREFERRED EMBODIMENTS

Figure 1:
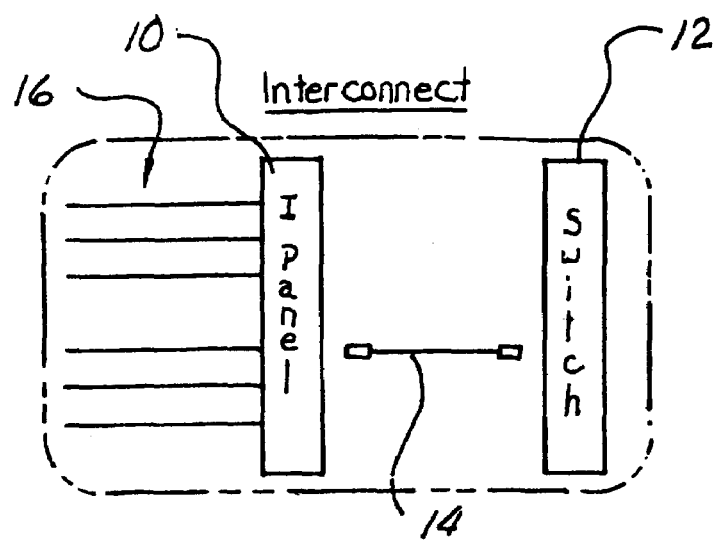
FIG. 1 is a block diagram of an intelligent patch panel and a network switch in a network having an interconnect configuration.

The present invention is directed to methods and systems for documenting and guiding patch cord changes in a patch field of a communications network. FIG. 1 shows a preferred embodiment, in which an intelligent patch panel 10 and a network switch 12 in a communications network are connected in an interconnect configuration. This embodiment provides real-time documentation which is reliable under all conditions and it provides an efficient indicator light system on all patch panel and switch ports (jacks) to guide technicians when installing or removing patch cords. In the embodiments shown and described herein, the network switch is an Ethernet switch, but it is to be understood that the present invention can be applied to other types of networks.

A patch cord 14 connects a port on the switch 12 to a port on the intelligent patch panel 10. Horizontal cabling 16 connects the intelligent patch panel 10 to endpoint devices, such as computers and telephones.

Figure 2:
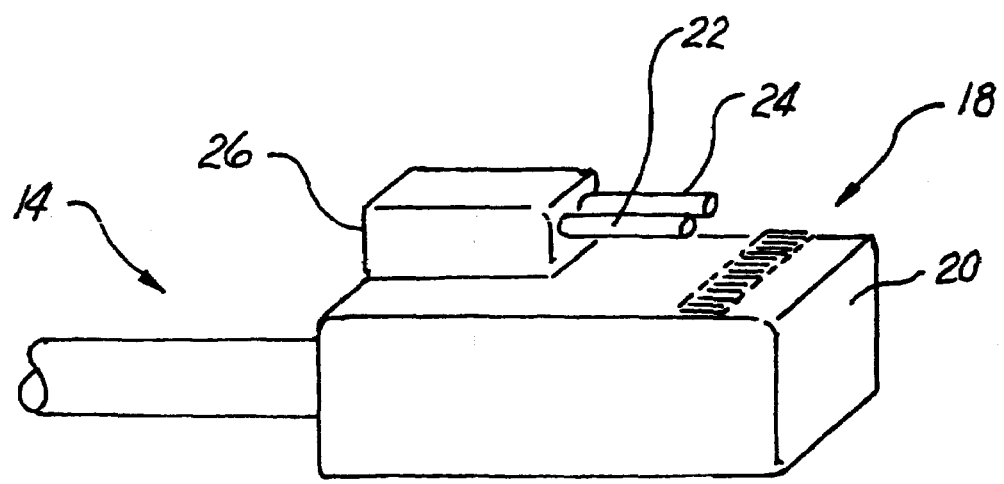
FIG. 2 is an upper left side view of a plug for a 10-wire patch cord with two pogo pins.

In a preferred embodiment as illustrated in FIG. 2, the patch cord 14 is a ten-wire patch cord. Eight of the wires comprise a standard four-pair Ethernet channel corresponding to the standard plug contacts 18 on the plug 20. The ninth wire and the tenth wire terminate at first and second pogo pins 22 and 24, respectively, for connection to contacts provided on intelligent patch panels and on switches. The pogo pins are provided in a pogo pin module 26 which is asymmetrically positioned to allow for situations where the jacks on a switch are vertically adjacent each other (for example, in a 2×24 arrangement).

Figure 3:
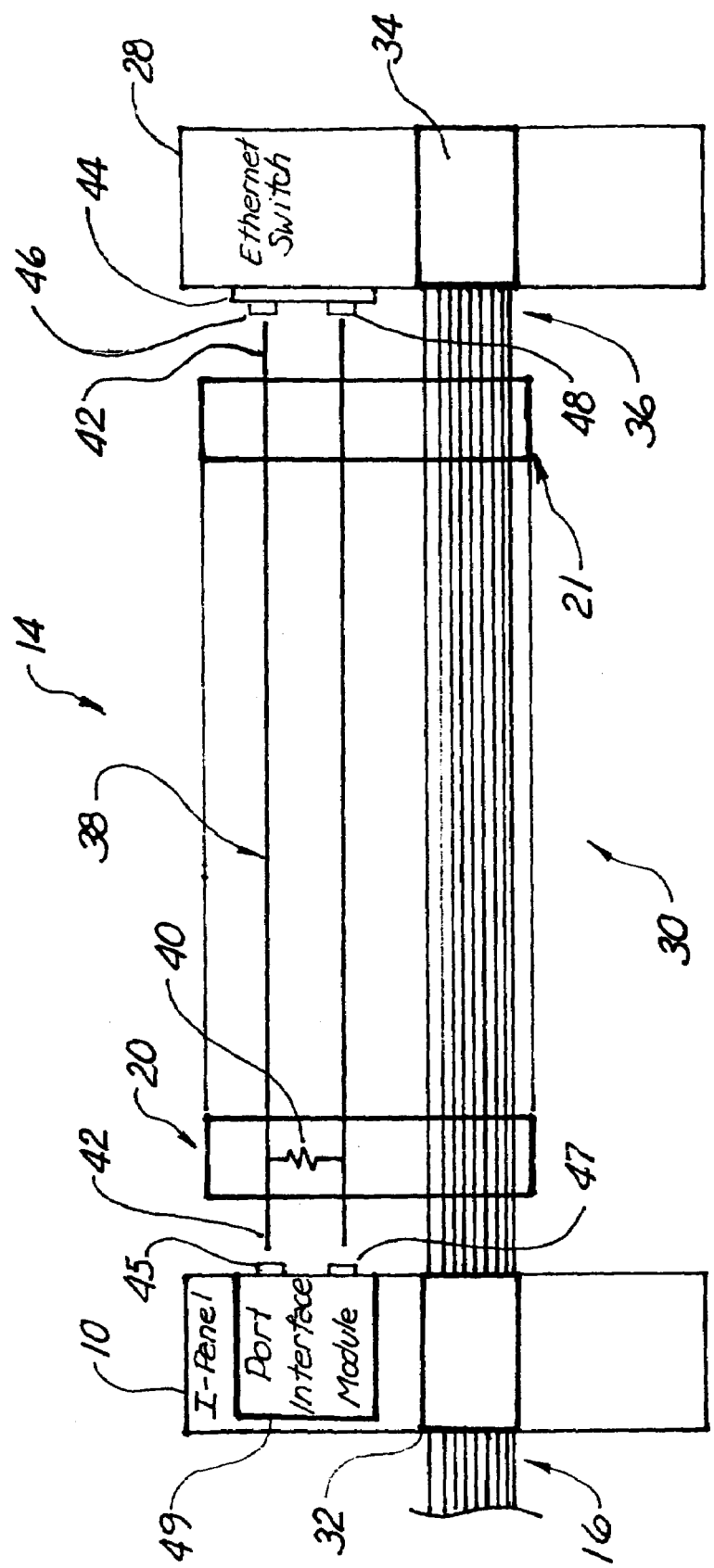
FIG. 3 is block diagram of a patch cord connection in a patch cord management system according to one embodiment of the present invention.

FIG. 3 shows a patch cord 14 installed between an intelligent patch panel 10 and an Ethernet switch 28 in a system that allows for patch cord documentation and revision in the patch field 30 between the intelligent patch panel 10 and the Ethernet switch 28. Patch cord documentation and revision is enabled because each Ethernet switch 28 (or group of ports on an Ethernet switch) is assigned a unique identifier code, and each port 34 on that Ethernet switch 28 (or within that group of Ethernet switch ports) is assigned a sequential port number (i.e. 1–24 or 1–48). A similar identification procedure is used for each intelligent patch panel or group of ports on an intelligent patch panel. Thus, each switch port 34 that is connected to an intelligent patch panel 10 is provided with a unique identifier code.

The group of switches and the patch panels to which they are connected are assigned a unique identifier and this is transmitted along with the patch panel group, switch group, and port I.D.s of ports in the group to a Network Management System (NMS) by an intelligent patch panel.

The patch cord 14 comprises four signal pairs 36 and one system pair 38 consisting of the ninth and tenth conductors. The signal pairs 36 provide standard Ethernet signal connectivity. The system pair 38 enables the intelligent patch panel 10 to send signals to electronic components positioned on the face of the Ethernet switch 28. These electronic components may be provided on printed circuit boards (PCBs) provided in appliqués that are attached to the face of the Ethernet switch 28. A resistor 40 with a high resistance is placed across the system pair 38 of the patch cord 14. In the embodiment of FIG. 3, the resistor is placed within a plug of the patch cord 14.

The system pair 38 makes contact via probes 42 with conductive pads 45 and 47 on the face of the intelligent patch panel 10 and with conductive pads 46 and 48 on an appliqué 44 attached to the Ethernet switch 28. The probes 42 may be pogo pins, as discussed above. The probes 42 complete an electrical circuit between a PCB in the intelligent patch panel 10 and a PCB in the appliqué 44 when the patch cord 14 is installed between the patch panel port 32 and the switch port 34. The PCB in the intelligent patch panel 10 may include a port interface module 49, which implements the functions of the intelligent system as further discussed below.

Installation and/or revision of the plugs 20 of interconnect patch cords 14 is preferably guided by a wireless portable PC (a work order PC) which provides work orders in sequence to the responsible technician.

When a patch cord 14 is installed, one plug is plugged into the intelligent patch panel 10 with the guidance of an indicator light adjacent the correct port. An indicator light adjacent to the port to which the patch cord was connected communicates to the technician that this step was correct or incorrect. This portion of the system is the Patch Panel Plug Presence System.

When the other end of this patch cord 14 is plugged into a switch port 34, the intelligent system in the intelligent patch panel 10 detects this step and an indicator light adjacent to the port which the patch cord was connected to will communicate to the technician that this step was correct or incorrect. This portion of the system is the Switch Plug Presence System.

The patch cord removal guidance is similar to the above.

When a patch cord 14 is installed, an intelligent system in the intelligent patch panel 10 monitors the connection between the two ports 32 and 34 in real time. If the patch field 30 was newly installed or if the system operation was temporarily interrupted, the system immediately determines the documentation of the interconnect patch field 30. This documentation is therefore completely reliable and in real time.

Each intelligent patch panel 10 includes circuits and circuit components which accomplish all the above and which communicate with an NMS via Ethernet signals through a switch. According to one embodiment, the only electrical connections to each intelligent patch panel 10 (other than patch cord connections) are the four-pair Ethernet cable for connection to the NMS and a power cord.

Figure 4:
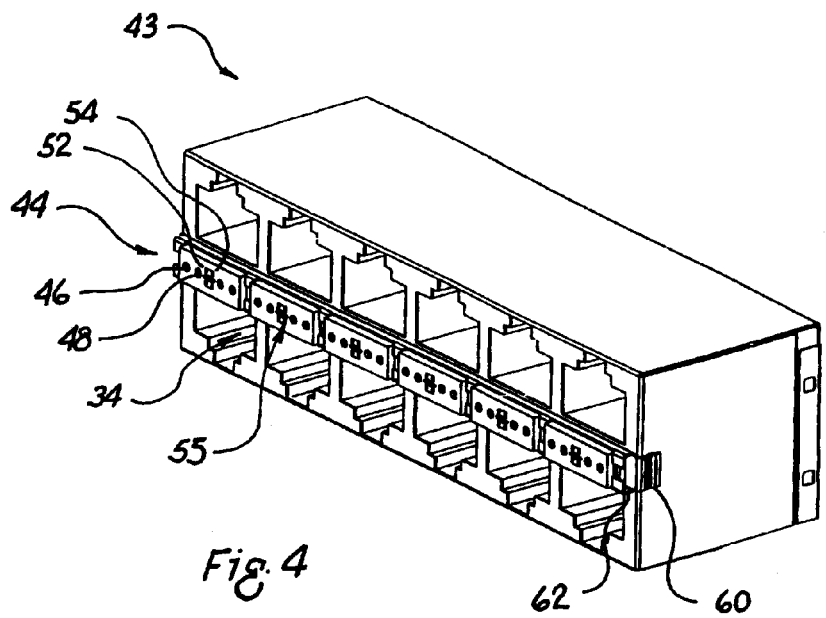
FIG. 4 is a perspective view of a switch port module with an appliqué.

Turning now to FIG. 4, a perspective view of a switch module 43 with an appliqué 44 is shown. The switch module 43 has twelve switch ports 34, but it is to be understood that the present invention may be scaled for use with switch modules having fewer or more ports. The appliqué 44 has first and second conductive pads 46 and 48 for each switch port 34. The conductive pads 46 and 48 are conductively connected to switch port identification circuits 50 as described below with reference to FIGS. 11–13. As shown in FIG. 4, the appliqué 44 may be attached to a switch port module 43 by clips 60 formed in a frame 62.

Figure 5:
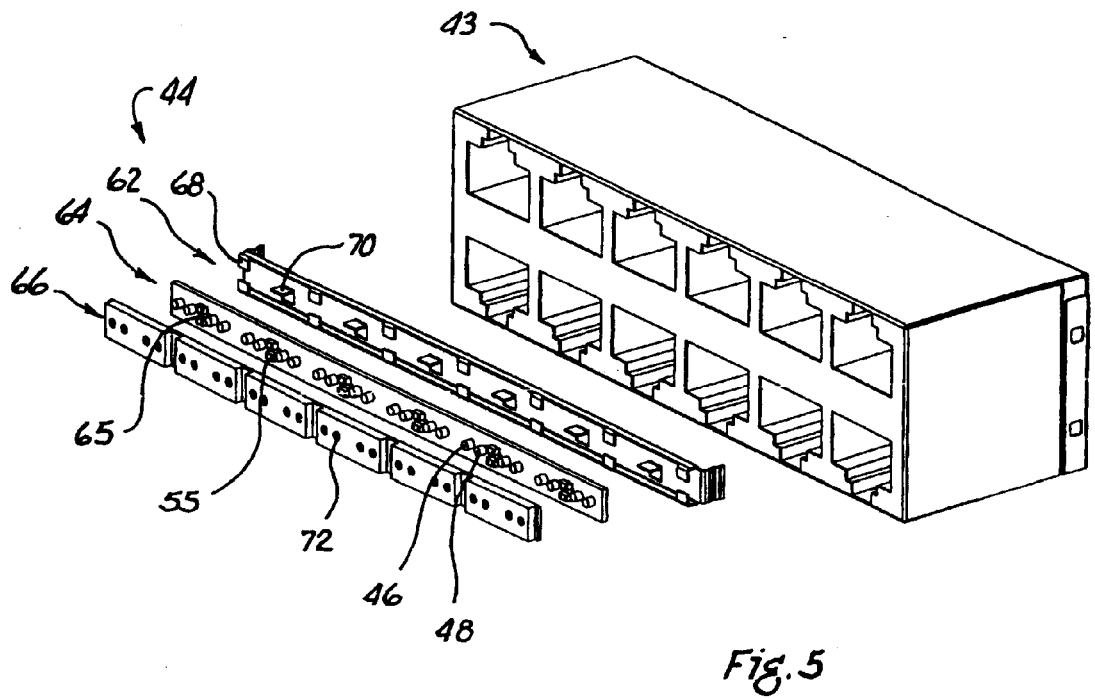
FIG. 5 is an exploded perspective view of a switch port module with an appliqué.
Figure 11:
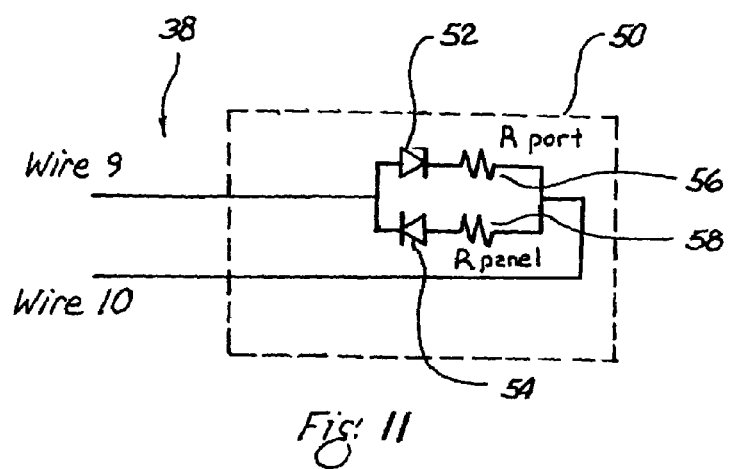
FIG. 11 is a schematic diagram of a port identification circuit.
Figure 12:
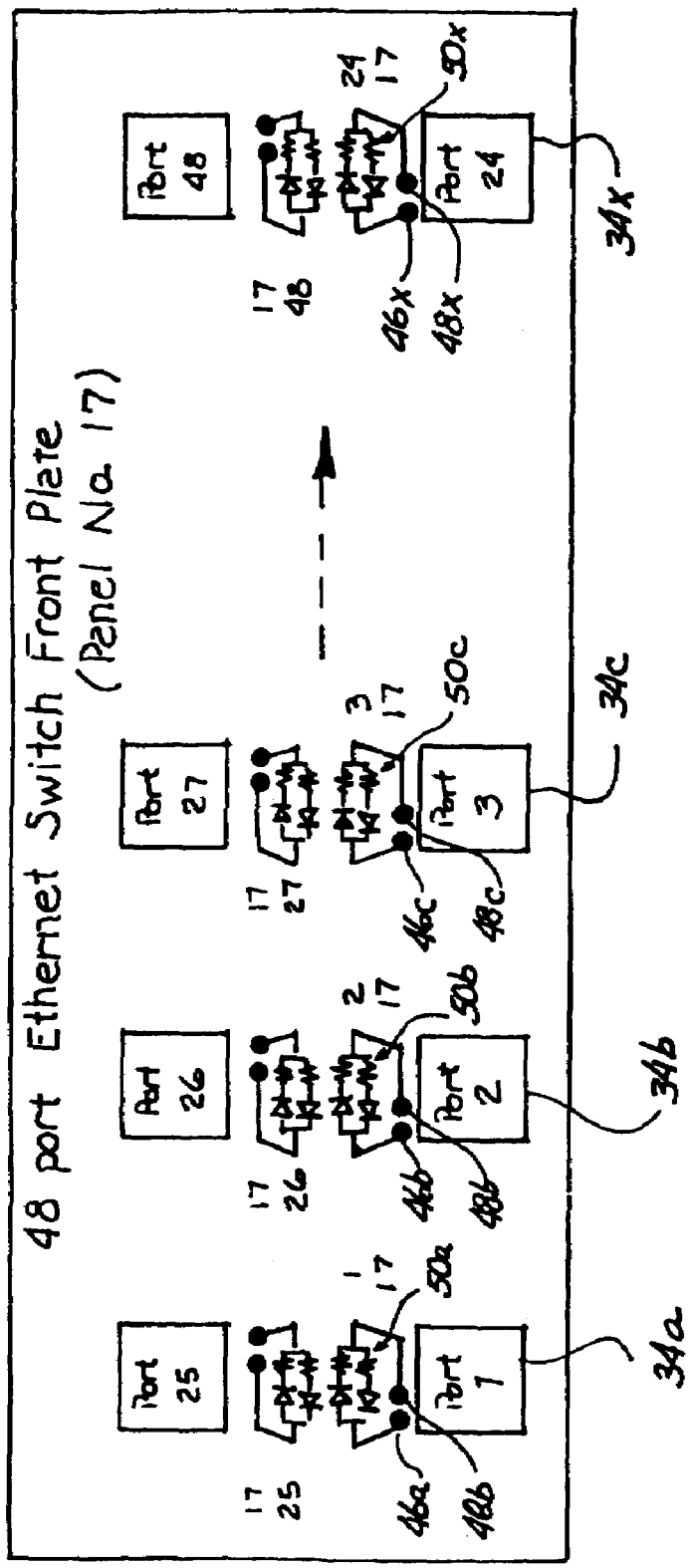
FIG. 12 is a block diagram showing multiple port identification circuits for an Ethernet switch.

FIG. 5 is an exploded view of the appliqué 44 attached to the switch module 43. The appliqué 44 comprises three main parts: a frame 62, a circuit board 64, and a cover 66. The frame 62 is preferably constructed of metal and is provided with mounting tabs 68 for retaining the circuit board 64 and the cover 66. Reflectors 70 are formed in the frame 62 to optically isolate the LED modules 55 from one another. This assures that light emitted from upper or lower LED modules 55 are not mistakenly associated with wrong switch ports 34 by a technician. The circuit board 64 has the conductive pads 46 and 48 as well as the LED modules 55 and the other circuitry for the switch port identification circuits 50 (as shown in FIGS. 11 and 12). The circuit board 64 has circuit board apertures 65 to accommodate the reflectors 70. The cover 66 is preferably constructed of a clear material and is provided with cover apertures 72 to allow probes 42 of patch cords to make contact with the conductive pads 46 and 48 on the circuit board 64. According to one embodiment, the appliqué 44 is constructed by positioning the circuit board 64 between the cover 66 and the frame 62 and bending the mounting tabs 68 into the mounting positions shown in FIG. 5, holding the circuit board 64 between the cover 66 and the frame 62.

Figure 6:
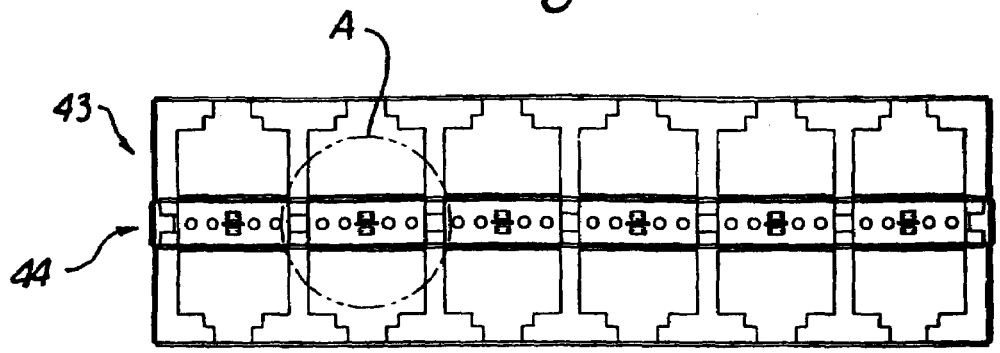
FIG. 6 is a front view of a switch port module with an appliqué.
Figure 7:
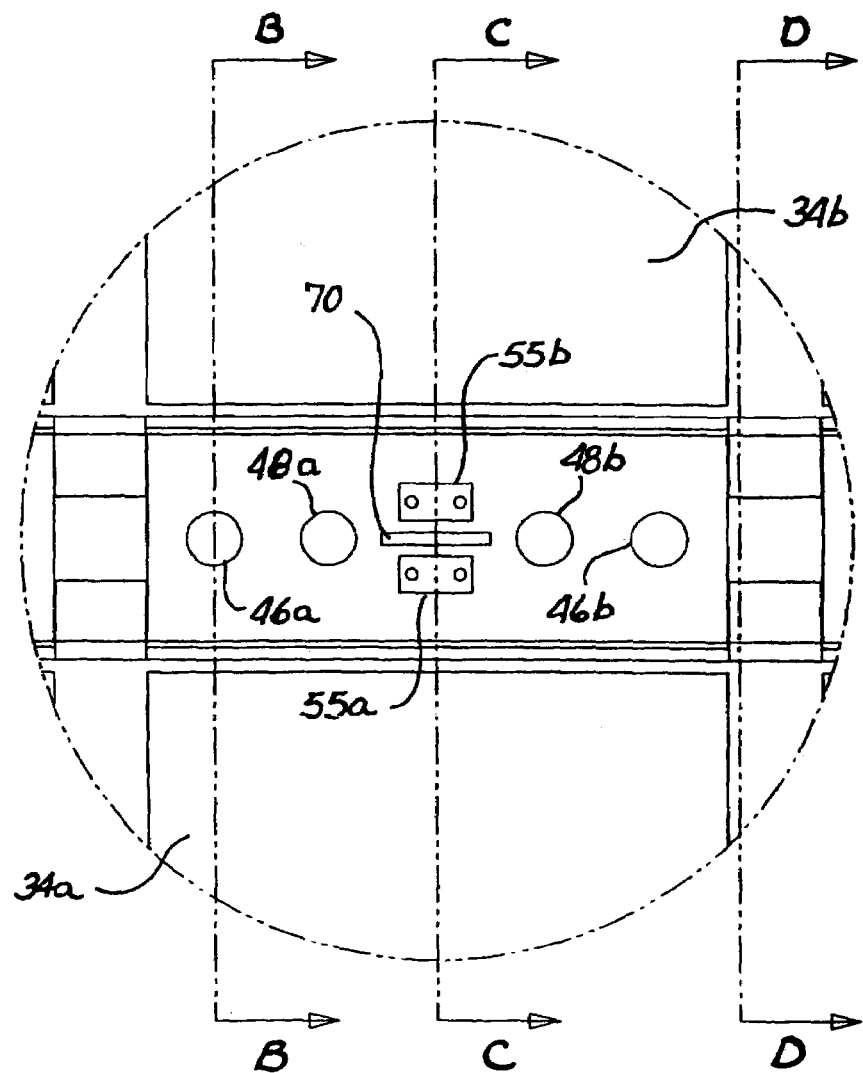
FIG. 7 is a detail view of the detail "A" of FIG. 6.
Figure 8:
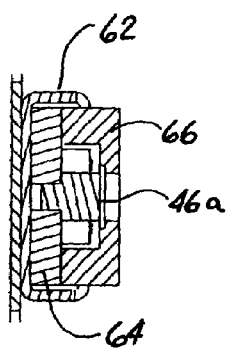
FIG. 8 is a cross-sectional view along the line "B—B" of FIG. 7.
Figure 9:
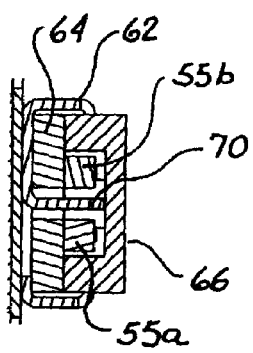
FIG. 9 is a cross-sectional view along the line "C—C" of FIG. 7.
Figure 10:
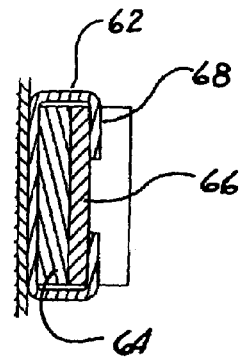
FIG. 10 is a cross-sectional view along the line "D—D" of FIG. 7.

FIG. 6 is a front view of a switch module 43 with an appliqué 44 mounted thereon. FIG. 7 is a detail view of the detail "A" of FIG. 6. According to an embodiment utilizing the plug 20 of FIG. 2, the first and second conductive pads 46*a* and 48*a* on the left side of the view of FIG. 7 are associated with the lower switch port 34*a*. The first and second conductive pads 46*b* and 48*b* on the right side of the view of FIG. 7 are associated with the upper switch port 34*b*. Also shown in FIG. 7 are bi-color LED modules 55*a* and 55*b*, respectively associated with the lower and upper switch ports 34*a* and 34*b*. The reflector 70 separates the bi-color LED modules 55*a* and 55*b*. FIGS. 8, 9, and 10 are cross-sectional views along the lines B—B, C—C, and D—D, respectively, of FIG. 7. The cross-sectional view of FIG. 8 shows the first conductive pad 46*a*. The cross-sectional view of FIG. 9 shows the bi-color LED modules 55*a* and 55*b* and the reflector 70. The cross-sectional view of FIG. 10 shows the mounting tabs 68 of the frame 62 bent over the cover 66.

As further discussed below with reference to FIGS. 11–13, the conductive pads 46 and 48 on the appliqué 44 are connected to signature resistors having different values of resistance corresponding to individual switch ports. The signature resistors have unique values corresponding to each switch port or each group of switch ports. The intelligent patch panel 10 continuously makes resistance measurements across the system pair 38. If an open circuit is measured, this implies that no patch cord 14 is attached to the intelligent patch panel. If a high resistance is measured, this implies that the patch cord 14 is only attached to the intelligent patch panel 10. If a resistance within the range of the resistance values of the signature resistors in the appliqué 44 at the Ethernet switch 12 is measured, this implies that both ends of the patch cord 14 are attached.

Turning to FIGS. 11 and 12, switch port identification circuits 50 are shown. The switch port identification circuits 50 comprise light-emitting diodes (LEDs) 52 and 54 (which may be implemented as bi-color LED modules 55), port signature resistors 56, and panel signature resistors 58. In one embodiment, LED 52 is red and LED 54 is green. The panel signature resistors 58 may indicate the switch panel corresponding to each port, or they may be substituted for signature resistors indicating particular switches or switch groups containing each port. According to one embodiment, each switch module in a switch is provided with a different signature resistor. In this embodiment, the signature resistors 58 would not be panel signature resistors, but rather would be switch module signature resistors. When measuring the port signature resistors 56, a forward bias is applied to the ninth wire and the resistance is measured. When measuring the panel signature resistor 58 (or other associated group signature resistor), a reverse bias is applied to the ninth wire and the resistance is measured. FIG. 12 is a block diagram showing the switch port identification circuits 50 associated with each port of a 48-port switch. Conductive pads 46 and 48 are also shown.

In one embodiment, a constant current source in the intelligent patch panel is used to light revision lights for the revision system to provide uniform illumination.

According to one embodiment, the revision light system for each patch panel port is as follows:

| | |
|---|---|
| Green solid: | Install plug |
| Green off: | Installed correctly |
| Red pulsating: | Plug was installed in wrong port; remove |
| Red off: | Removed correctly |
| Green pulsating: | Remove plug |
| Green off: | Removed correctly |
| Red solid: | Adjacent plug was removed erroneously; reinstall |
| Red off: | Adjacent plug reinstalled correctly |

The revision light system for each switch port is as follows:

| | |
|---|---|
| Green solid: | On for time delay after correct installation |
| Red pulsating: | Plug was added to wrong port; remove |
| Green pulsating: | Remove plug |
| Yellow pulsating: (Light that was green changed to yellow) | Wrong plug was removed; replace plug which was erroneously removed; when replaced, yellow pulsating light changes to green pulsating. |

The yellow indicator light is obtained by the combination of the red and green indicator lights. According to one embodiment, an audible alarm may be initiated by an intelligent patch panel to indicate to the installer that a wrong operation was performed (for example, if an incorrect plug was removed from an Ethernet switch port).

When an error in plug installation or removal has occurred, the system provides an indicator light and/or audible alarm from the associated patch panel. An alarm notice and details of the error and remedy are provided on the work order PC. No further revision steps are ordered until the error has been corrected.

It should be noted that a switch jack light will not guide the installation of a plug to the switch 12 because the power for the light is supplied through the patch cord 14. However, if a plug is correctly installed, a green indicator light will turn on for a time delay. If a plug is installed in an incorrect port, a flashing red indicator light adjacent to that port will stay on until the plug is removed. Such a temporary incorrect patch cord connection should not be detrimental because that incorrect switch port should not be energized.

Figure 13:
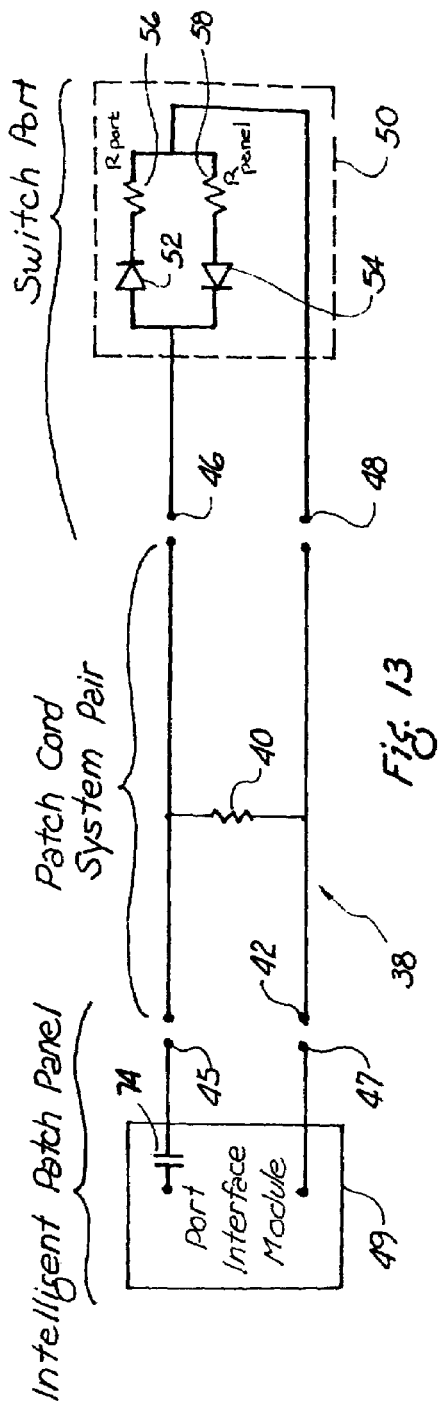
FIG. 13 is a schematic diagram of a patch cord system pair connection in a patch field documentation and revision system.

FIG. 13 is a schematic diagram of a patch cord system pair connection between a port interface module 49 of an intelligent patch panel and a port identification circuit 50 located at an Ethernet switch port. The port interface module 49 is connected via conductive pads 45 and 47 to probes 42 of the system pair 38 of the patch cord. The system pair 38 of the patch cord is further connected to the conductive pads 46 and 48 at the switch port. The port interface module 49 implements the functions necessary to support the intelligent system of the intelligent patch panel 10. According to one embodiment, the port interface module 49 comprises circuitry to implement three functions of the intelligent system of the intelligent patch panel: (a) detecting the presence of a plug in the intelligent patch panel; (b) identification of Ethernet switch ports and detection of the presence of plugs in the switch ports; and (c) powering indicator lights at the Ethernet switch ports. Detection of plug presence in the patch panel ports and switch ports and identification of Ethernet switch ports are preferably accomplished using AC signals generated by the port interface module 49. The resulting response signals are detected by the port interface module 49, allowing plug detection and Ethernet switch port identification. LEDs 52 and 54 in the port identification circuit 50 may be powered by the port interface module 49, either one-at-a-time or simultaneously, via pulsed DC or AC. A capacitor 74 protects the circuitry of the port interface module 49 from high voltages that might be placed across the system pair 38 of the patch cord.

Figure 14:
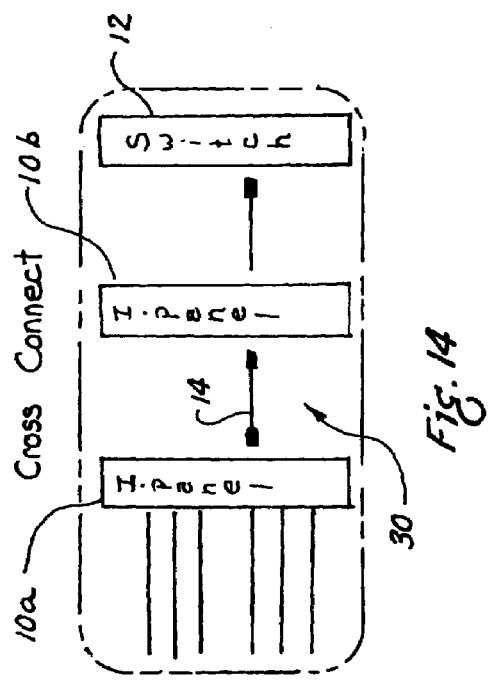
FIG. 14 is a block diagram of intelligent patch panels and a network switch in a network having a cross-connect configuration.

Systems and methods according to the present invention may be adapted for use in a cross-connect network. In the cross-connect embodiment as shown in FIG. 14, in which the relevant patch field 30 is between two intelligent patch panels 10*a* and 10*b*, the same patch cords 14 as described above are used between the intelligent patch panels 10*a* and 10*b*. The plug presence part of the above-described system is utilized, providing this benefit without the need for additional dedicated plug sensors. However, the documentation portion of this system may be as described in U.S. patent application Ser. No. 11/265,316 and U.S. Provisional Patent Application Ser. No. 60/624,753. In this embodiment, each patch panel communicates with a control system via Ethernet signals.

Other embodiments can accomplish the goals of the present invention utilizing different circuit elements (e.g., resonant circuits providing frequencies associated with port/panel identification information) or chips (e.g., I.D. chips).

In addition, other embodiments utilize local power and/or a signal and/or ground connections to each switch PCB. The number of system wires in each patch cord and the number of plug probes could also vary. For example, in one alternative embodiment foregoing plug detection at the patch panel, one system wire and system grounding are used in place of two system wires for switch port identification. In alternative embodiments, the switch can be replaced with a patch panel, with an appliqué being applied to the patch panel.

What is claimed is:

1. A patch field system comprising:
   a communication network device having a communication network device port module, a plurality of ports, and an appliqué attached to a face of the communication network device port module, the appliqué including a printed circuit board (PCB) with a plurality of conductive pads;
   an intelligent patch panel having a plurality of ports and a plurality of conductive pads; and
   a patch cord adapted to connect one of the ports of the communication network device with one of the ports of the intelligent patch panel, each end of the patch cord including a plug, the patch cord including signal pairs that terminate at plug contacts of each plug, and a system wire that terminates at a probe of each plug, the system wire enabling communication between the intelligent patch panel and the PCB via contact between the probes of opposing plugs and the conductive pads of the intelligent patch panel and the communication network device,
   wherein the intelligent patch panel is adapted to measure a resistance associated with each port via the system wire, an open circuit measurement indicating that no patch cord is attached to the port, a measurement within a first resistance range indicating that the patch cord is attached only to the port of the intelligent patch panel, a measurement within a second resistance range less than the first resistance range indicating that the patch cord connects the intelligent patch panel and the communication network device.

2. The patch field system of claim 1, wherein:
   the appliqué further comprises a conductive frame having mounting tabs and a cover,
   the PCB comprises an LED module containing different color LEDs, the LED module adjacent to one of the ports of the communication network device; and
   the PCB and cover are retained by the mounting tabs such that the PCB is disposed between the cover and the frame.

3. The patch field system of claim 2, wherein:
   the PCB comprises adjacent LED modules,
   the frame comprises reflectors disposed between the adjacent LED modules, and
   the PCB has reflector apertures to accommodate the reflectors passing therethrough.

4. The patch field system of claim 1, wherein associated with each port in the communication network device is:
   a port signature resistor having a resistance dependent on the port, and
   a panel signature resistor having a resistance dependent on at least one of the communication network device or a group of ports to which the port belongs, the group of ports containing fewer than all of the ports of the communication network device.

5. The patch field system of claim 4, wherein the port and panel signature resistors are disposed such that, of the port and panel signature resistors, only the port signature resistor is measurable when a first voltage is applied to the conductive pad of the appliqué and only the panel signature resistor is measurable when a second voltage of opposite polarity than the first voltage is applied to the conductive pad of the appliqué.

6. The patch field system of claim 5, wherein:
   the PCB further comprises a port identification circuit that contains different color LEDs, and
   the port identification circuit is configured such that a series combination of the port signature resistor and an LED of a first color is connected in parallel with a series combination of the panel signature resistor and an LED of a second color.

7. The patch field system of claim 1, wherein:
   the probe comprises a pogo pin,
   the patch cord comprises a system pair of system wires that contains the system wire, each system wire of the system pair terminating at a different pogo pin, and
   the pogo pins are provided in a pogo pin module.

8. The patch field system of claim 7, wherein:
   at least one of the communication network device or the intelligent patch panel has first and second ports adjacent in a first direction, and
   the pogo pin module is asymmetrically positioned with respect to a center of the plug and is offset in a second direction orthogonal to the first direction such that the pogo pin modules of patch cords inserted into the first and second ports overlap each other in the second direction.

9. A communication network device comprising:
   a port module containing a plurality of ports, each port configured to accept a patch cord plug; and
   an appliqué attached to a face of the port module between sets of adjacent ports, the appliqué containing a printed circuit board (PCB) that includes, associated with each port in the sets of adjacent ports:
      a conductive pad,
      an LED module, and
      a port identification circuit, the port identification circuit including:
         a port signature resistor having a resistance dependent on the port, and
         a panel signature resistor having a resistance dependent on at least one of the communication network device or a group of ports to which the port belongs, the group of ports containing fewer than all of the ports of the communication network device.

10. The device of claim 9, wherein:
    the appliqué further comprises a conductive frame having mounting tabs and a cover,
    each LED module contains a plurality of different color LEDs and is adjacent to one of the ports; and
    the PCB and cover are retained by the mounting tabs such that the PCB is disposed between the cover and the frame.

11. The device of claim 10, wherein:
    the frame comprises reflectors disposed between adjacent LED modules, and
    the PCB has reflector apertures to accommodate the reflectors passing therethrough.

12. The device of claim 10, wherein the port identification circuit is configured such that a series combination of the port signature resistor and an LED of a first color is connected in parallel with a series combination of the panel signature resistor and an LED of a second color.

13. The device of claim 9, wherein the port and panel signature resistors are disposed such that, of the port and panel signature resistors, only the port signature resistor is measurable when a first voltage is applied to one of the conductive pads and only the panel signature resistor is measurable when a second voltage of opposite polarity than the first voltage is applied to the one of the conductive pads.

14. The device of claim 9, wherein:
a plurality of conductive pads are associated with each port of at least a set of the ports, and
the conductive pads associated with a particular port in the set of ports are asymmetrically positioned with respect to a center of the particular port.

15. The device of claim 14, wherein:
the set of the ports contains ports that are adjacent in a first direction, and
the conductive pads associated with the adjacent ports overlap in a second direction orthogonal to the first direction.

16. A communication network device comprising:
a port module;
a plurality of ports configured to accept a patch cord plug;
a printed circuit board (PCB) containing a port identification circuit associated with one of the ports, the port identification circuit including:
 a port signature resistor having a resistance dependent on the port and that is measurable when a first voltage is applied to the port identification circuit but not when a second voltage of opposite polarity than the first voltage is applied to the port identification circuit, and
 a panel signature resistor having a resistance dependent on at least one of the communication network device or a group of ports to which the port belongs and that is measurable when the second voltage is applied to the port identification circuit but not when the first voltage is applied to the port identification circuit, the group of ports containing fewer than all of the ports of the communication network device.

17. The device of claim 16, wherein:
the PCB further comprises a plurality of LED modules, each LED module containing a plurality of different color LEDs and associated with a different port;
reflectors are disposed between adjacent LED modules, and
the PCB has reflector apertures to accommodate the reflectors passing therethrough.

18. The device of claim 17, wherein the port identification circuit is configured such that a series combination of the port signature resistor and an LED of a first color is connected in parallel with a series combination of the panel signature resistor and an LED of a second color.

19. The device of claim 16, wherein:
a plurality of conductive pads are associated with each port of at least a set of the ports, and
the conductive pads associated with a particular port in the set of ports are asymmetrically positioned with respect to a center of the particular port.

20. The device of claim 19, wherein:
the set of the ports contains ports that are adjacent in a first direction, and
the conductive pads associated with the adjacent ports overlap in a second direction orthogonal to the first direction.

* * * * *